(12) United States Patent
Liao

(10) Patent No.: US 6,575,082 B1
(45) Date of Patent: Jun. 10, 2003

(54) AIR FUNNEL ROASTER

(76) Inventor: Huo-Hsiung Liao, No. 24, Lane 2, Lung-Hsiang Street, Chung-Ii city (TW)

(*) Notice: Subject to any disclaimer, the term of this patent is extended or adjusted under 35 U.S.C. 154(b) by 0 days.

(21) Appl. No.: 10/266,764

(22) Filed: Oct. 9, 2002

(51) Int. Cl.[7] .......... A47J 37/00; A47J 37/04; A47J 37/07; A47J 43/18; A23L 1/00

(52) U.S. Cl. .......... 99/340; 99/345; 99/419; 99/426; 99/446; 99/450

(58) Field of Search .......... 99/339, 340, 345–347, 99/419–421 V, 444–450, 400, 401, 415–418; 126/25 R, 41 R, 9 R; 426/509, 523

(56) References Cited

U.S. PATENT DOCUMENTS

| | | | | |
|---|---|---|---|---|
| 1,339,625 A | * | 5/1920 | Holloway | 99/345 X |
| 1,344,915 A | * | 6/1920 | Love | 99/345 |
| 1,485,253 A | * | 2/1924 | Devlin | 99/419 X |
| 4,127,060 A | * | 11/1978 | Curtis | 99/419 |
| 5,301,602 A | * | 4/1994 | Ryczek | 99/345 |
| 5,575,198 A | * | 11/1996 | Lowery | 99/426 |
| 6,062,131 A | * | 5/2000 | Holland | 99/345 |
| 6,119,585 A | * | 9/2000 | Guidry | 99/446 X |
| 6,125,739 A | * | 10/2000 | Jernigan | 99/345 |
| 6,192,792 B1 | * | 2/2001 | Gremillion | 99/426 |
| 6,349,632 B1 | * | 2/2002 | Beck, Jr. | 99/419 X |
| 6,427,582 B1 | * | 8/2002 | Measom | 99/342 |
| 6,467,399 B1 | * | 10/2002 | Boutte | 99/347 |

* cited by examiner

*Primary Examiner*—Timothy F. Simone
(74) *Attorney, Agent, or Firm*—Troxell Law Office PLLC

(57) ABSTRACT

An air funnel roaster coated with non-stick inside and outside comprises a circular roaster body with handles and a funnel affixed vertically in the center which is open to the bottom exterior of the body, a roaster cover with handle, a steaming plate, and a supporting rack. A circular concave space is formed on the bottom of the roaster body, and a steaming plate or a supporting rack can be put above the concave space. When a steaming plate is put above the concave space with water, the roaster is heated to steam foods. When a supporting rack is put above the concave space with spices, the roaster is heated to smoke foods. And when the rack is used without anything in the concave space, the roaster is used to bake foods. And the roaster can also used in baking a whole fowl with the fowl placed vertically over the funnel. While steaming or smoking foods, the roaster body is covered with a roaster cover to avoid lost of vapor or heat, and a funnel can communicate heat to achieve adequate circulating of heat in a roaster and rapid cooking.

6 Claims, 4 Drawing Sheets

AIR FUNNEL ROASTER

BACKGROUND OF THE INVENTION

1. Field of the Invention

The present invention relates to an air roaster, especially to an air funnel roaster wherein baking, steaming or smoking foods is more effectively achieved by a funnel to utilize heat more efficiently

2. Description of the Prior Art

Generally, an air roaster bakes foods with upward heat generated by heating the bottom of the roaster in an oven or a stove, and the upper portion of foods can also be heated with air convection. In addition, an air roaster can also be used for smoking foods when spices are put on the bottom of a roaster and the roaster is heated, then the smoke is generated to smoke foods. Additionally, foods can be steamed when water is placed in the bottom of a roaster and heated.

However, the conventional air roaster cannot uniformly heat the foods put inside the roaster only by air convection, and the upper portion of foods might be still uncooked when the lower portion of foods are scorched. In order to heat foods uniformly, people have to frequently open the roaster and turn the foods over. Such a method requires more labour and attention as well as causing heat loss extending cooking time. The conventional air roaster does not have the capability of cooking meat internally.

In view of the above-mentioned disadvantages of cooking foods in a conventional air roaster, an air funnel roaster was created after being tested and improved repeatedly by the inventor of the present invention.

SUMMARY OF THE INVENTION

Accordingly, the present invention is developed to solve the above problems of prior art. And it is an object of the present invention to provide an air funnel roaster having simple structure and a few elements, whereby an air funnel roaster can be easily manufactured with lower cost.

It is another object of the present invention to provide an air funnel roaster coated with non-stick inside and outside for ease of cleaning.

It is an other object of the present invention to provide an air funnel roaster which can uniformly generate heat, wherein heat is communicated upward by a funnel from the bottom of the roaster and passes though the funnel by conduction as well as by convection through the vents formed on the funnel, so as to uniformly heat foods in the roaster.

It is also another object of the present invention to provide a funnel roaster, which can uniformly bake a whole fowl in shortened time while retaining juiciness.

In order to achieve the above objects, the present invention provides an air funnel roaster comprising a roaster body with handles, a roaster cover with a handle, a funnel, a steaming plate, and/or a supporting rack. A circular concave space is formed on the upper surface of the bottom of the roaster, in which water or spices can be poured inside to steam or smoke foods. In addition, this area is used to collect fat drained during cooking. The body handles on each side of roaster body enable people to move the roaster conveniently. A hole is formed at the center of the roaster cover, for said funnel to pass through, and, a cover handle is fixed onto the cover for people to move the cover conveniently. There is also a plurality of small vents radiatively formed on a said steaming plate to ensure the steam produced from the bottom of the roaster can pass through the steaming plate and fill the roaster while the steaming plate can be used in steaming foods.

When a whole fowl is baked in the air funnel roaster, the fowl is placed vertically over the funnel and then, the roaster is put into an oven without cover, or onto a stove, with cover in place. The fowl is heated inside by the funnel while heated outside by the oven.

The present invention will be better understood and its numerous objects and advantages will become apparent to those skilled in the art by referencing to the following drawings.

DETAILED DESCRIPTION OF THE PREFERRED EMBODIMENT

An embodiment of the present invention will now be explained in detail with reference to the accompanying drawings.

Figure 1:
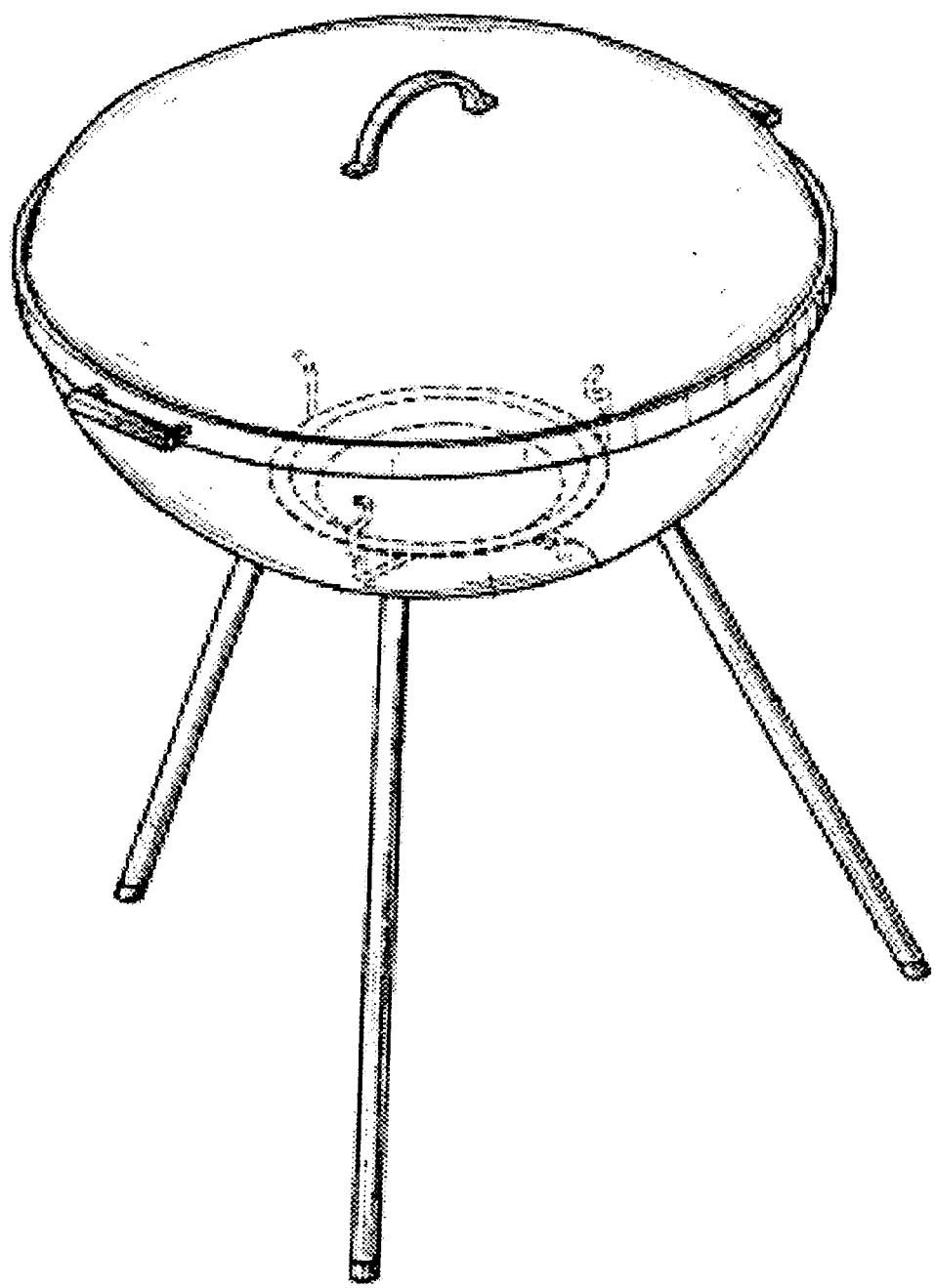
FIG. 1 is a perspective view of the preferred embodiment of the conventional air roaster.

The constitution and disadvantage of the conventional air roaster shown in FIG. 1 is not repeated herein.

Figure 2A:
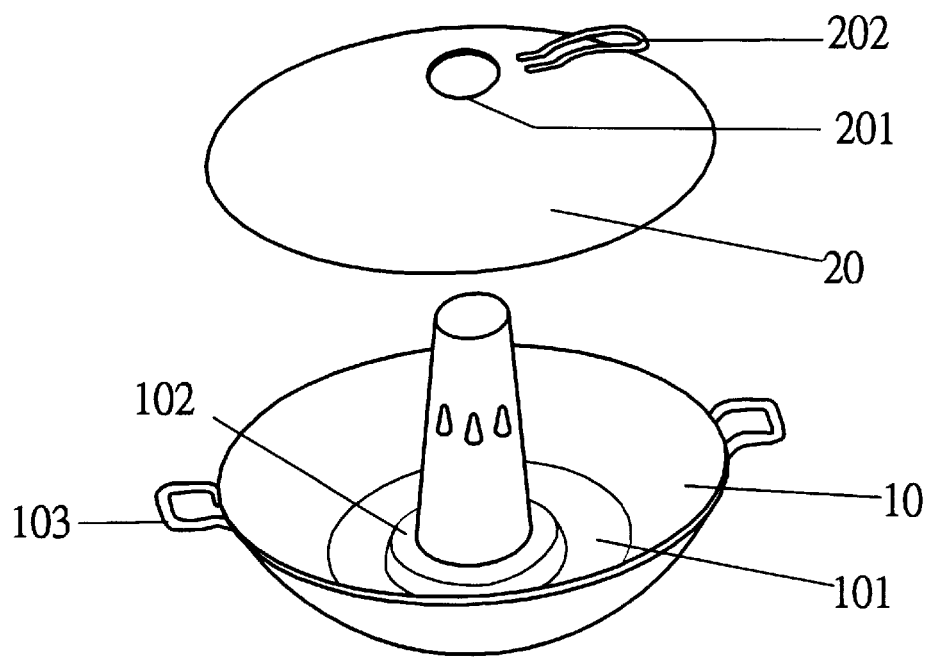
FIG. 2A is a perspective view of the preferred embodiment of the present invention.
Figure 2B:
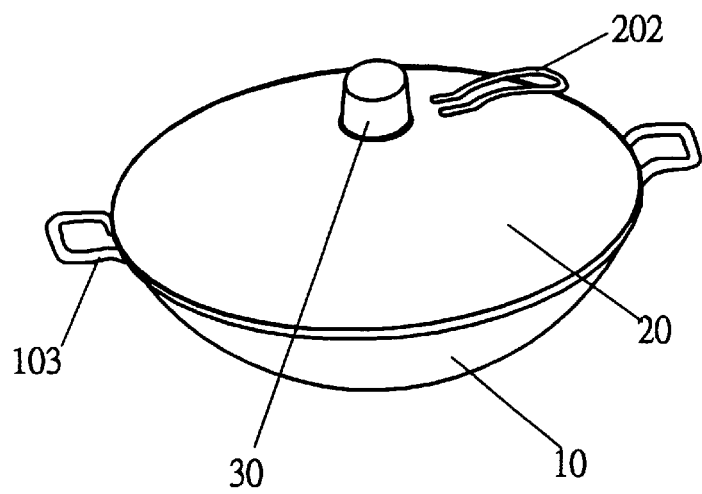
FIG. 2B is another perspective view of the preferred embodiment of the present invention.
Figure 3:
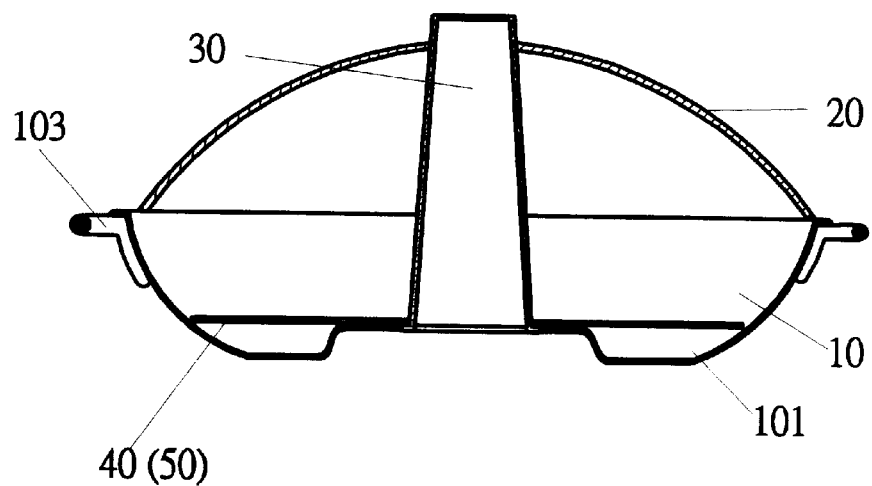
FIG. 3 is a cross-sectional view of the present invention.

FIGS. 2A and 2B are perspective views of the embodiment of the present invention and FIG. 3 is a cross-sectional view of the present invention. As shown in the drawings, the air funnel roaster of the present invention comprises a roaster body 10 having a circular concave space 101, and handles 103 are fixed onto both sides of the roaster body 10. At the center of the bottom of the roaster body 10, there is a hole 102 for a funnel 30 to put in.

Water or spices can be put in the circular concave space 101, and after the roaster is heated, foods are steamed or smoked by the steam or heat generated inside the roaster. While cooking, the temperature of roaster body 10 is too high for people to touch the roaster, and the body handles 103 can be used for people to move the roaster body 10 conveniently.

A funnel 30 is affixed on the hole 102 at the center of the bottom of the roaster body 10. And, the upper portion of the funnel 30 is closed to avoid lost of heat and fat or juices draining into oven or onto stove element. The funnel 30 is used to communicate heat from the heat sources and the heat in the funnel is transferred by conduction through walls and by convection through the vents 301 on the funnel 30, so as to heat the foods in the roaster uniformly and more efficiently.

A hole 201 is also formed at the center of the roaster cover 20, of which the diameter is slightly larger than the outer diameter of the funnel 30, whereby the funnel 30 can pass through the roaster cover 20 when the roaster is covered with the roaster cover 20. While steaming or smoking foods, the cover 20 covered onto the roaster body 10 will avoid lost of heat in the roaster and retain moisture. A cover handle 202 is also fixed onto the upper surface of the roaster cover 20 to enable people move the roaster cover 20 easily and then, to observe the condition of foods or to lower the temperature in the roaster during cooking.

Figure 4:
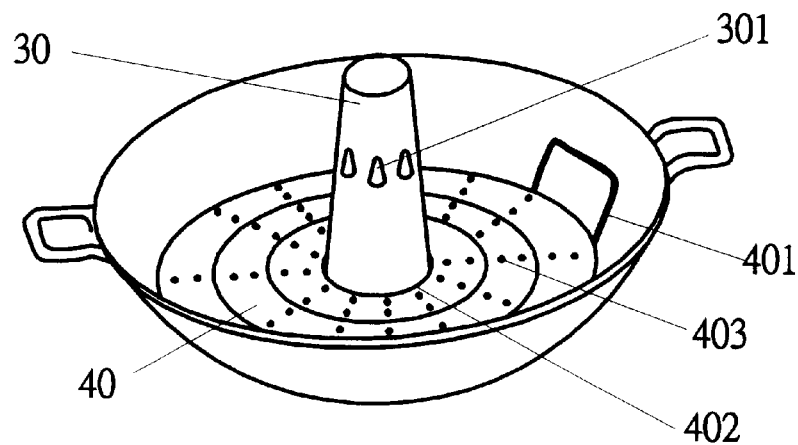
FIG. 4 is a perspective view of the preferred embodiment showing that an air funnel roaster is used with a steaming plate.

Referring to FIG. 4, it is preferable to use funnel roaster to steam foods with a steaming plate 40. A hole 402 is formed at the center of the steaming plate 40, of which the diameter is slightly larger than the outer diameter of the funnel 30. There are handles 401 on both sides of a steaming plate 40 to enable people move the steaming plate 40 conveniently. There a number of small vents 403 radiatively spread on the steaming plate 40. While steaming foods, a steaming plate 40, on which foods are put, is put above the roaster body, and the roaster is covered with the roaster cover 20. Then, the roaster is put into an oven or onto a stove. The steam generated in the circular concave space 101 passes the steaming plate 40 through the vents 403 to steam foods on the steaming plate 40. The roaster cover 20 put above the roaster body 10 can avoid lost of steam.

Figure 5:
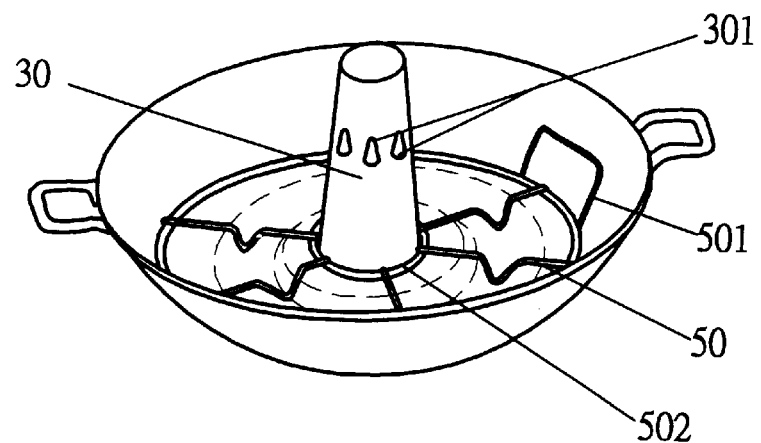
FIG. 5 is a perspective view of the preferred embodiment showing that an air funnel roaster is used with a supporting rack.

Referring to FIG. 5, it is preferable to use a roaster for baking or smoking foods with a supporting rack 50 formed into a radiative-net frame. A circular frame 502 is formed at the center of a supporting rack 50 of which the inner diameter is slightly larger than the outer diameter of the funnel, whereby the supporting rack 50 can be put around the funnel 30 when the rack 50 is applied. There are also handles 501 on both sides of a supporting rack 50 for people to move the rack 50 conveniently. While baking or smoking foods, a supporting rack 50 on which foods are put, is put above the roaster body 10, and the roaster is covered with the roaster cover 20. Then, the roaster is put into an oven or onto a stove. The steam or smoke of spices may pass through the rack 50 to steam or smoke foods, and heat may also communicate through the rack 50 to bake foods without spices or water in the said circular concave space 101. The roaster cover 20 put above the roaster body 10 can avoid lost of heated air.

Figure 6:
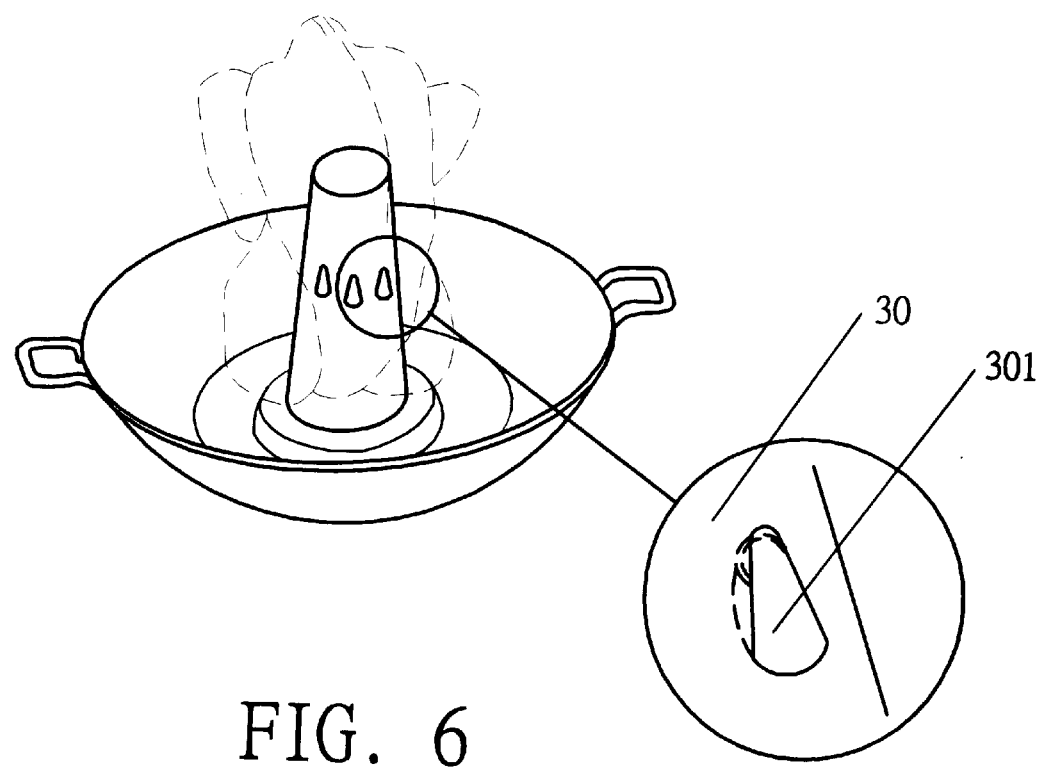
FIG. 6 is a perspective view of the preferred embodiment showing that an air funnel roaster with special one way vents is used in baking a whole fowl.

The air funnel roaster can also bake a whole fowl. As shown in FIG. 6, a fowl is put vertically over the funnel, and then, the roaster is put into an oven. The heat generated below the roaster in the oven is circulated through the funnel and passes up the funnel through the vents formed on the funnel as well as being conducted through the funnel walls to heat the inner of the fowl, and the other heat generated in the oven can also heat the outer of the fowl in the same time. Therefore, the fowl is heated uniformly. It can a produce juicy roast with shortened time. During baking a fowl, due to the special construction of the vents 301, that is, each vent formed on the funnel has eave formed on the inner surface of the funnel with opening upward, the fat generated will drain along the funnel, and will not pass the funnel through the vents on the funnel for the simple structure on the funnel.

While the present invention has been described herein with reference to particular embodiments thereof, latitude of modification, various changes and substitutions are intended in the foregoing disclosure. And in some instances, some features of the invention will be employed without a corresponding use of other features without departing from the spirit of the invention as set forth herein.

What is claimed is:

1. An air funnel roaster comprising a circular roaster body with handles and a funnel affixed vertically in the center which is open to the bottom exterior, a roaster cover with a handle, a steaming plate, and a supporting rack, characterized in that: a circular concave space is formed on the upper surface of the bottom of the roaster, in which water or spices can be poured inside to steam or smoke foods, the body handles on the roaster body enable people to move the roaster conveniently, a hole is formed at the center of the roaster cover, for said funnel to pass through, and there are also a plurality of small vents radiatively formed on said steaming plate to ensure the steam produced from the bottom of the roaster to pass through the steaming plate and fill the roaster.

2. The air funnel roaster as claimed in claim 1, wherein the air funnel is coated with non-stick inside and outside for ease of cleaning.

3. The air funnel roaster as claimed in claim 1, wherein the funnel is affixed to the hole at the center of the roaster body, and on the funnel there are a plurality of vents for the heat inside the funnel to uniformly spread out.

4. The air funnel roaster as claimed in claim 1, wherein the vents formed on the funnel have eaves formed on the inner surface of the funnel with opening upward for avoiding the fat drained from the fowl.

5. The air funnel roaster as claimed in claim 1, wherein a hole having a diameter slightly larger than the outer diameter of funnel is formed at the center of the steaming plate, whereby the funnel can pass through the steaming plate when the steaming plate is put above the roaster body, and a plurality of small vents are radiatively spread on the plate.

6. The air funnel roaster as claimed in claim 1 wherein a circular frame frame having a inner diameter slightly larger than the outer diameter of the funnel is formed at the center of the supporting rack, whereby the supporting rack can be put around the funnel as used.

* * * * *